(12) United States Patent
Sah et al.

(10) Patent No.: US 7,556,578 B2
(45) Date of Patent: Jul. 7, 2009

(54) METHOD AND APPARATUS TO CONTROL OPERATION OF A HYDRAULIC CONTROL CIRCUIT FOR AN ELECTRO-MECHANICAL TRANSMISSION

(75) Inventors: Jy-Jen F. Sah, West Bloomfield, MI (US); Aniket Kothari, Southfield, MI (US); Bryan R. Snyder, Waterford, MI (US); Michael D. Foster, Carmel, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 436 days.

(21) Appl. No.: 11/553,064

(22) Filed: Oct. 26, 2006

(65) Prior Publication Data

US 2008/0103003 A1 May 1, 2008

(51) Int. Cl.
*F16H 3/72* (2006.01)
(52) U.S. Cl. ........................................................ 475/5
(58) Field of Classification Search ..................... 475/5; 477/3
See application file for complete search history.

(56) References Cited

U.S. PATENT DOCUMENTS

| | | | |
|---|---|---|---|
| 7,288,039 B2* | 10/2007 | Foster et al. | 475/5 |
| 7,311,627 B2* | 12/2007 | Tarasinski | 475/5 |
| 7,383,903 B2* | 6/2008 | Varenne | 180/65.3 |
| 7,395,837 B2* | 7/2008 | Foster et al. | 137/557 |
| 2007/0284176 A1* | 12/2007 | Sah et al. | 180/305 |
| 2008/0182696 A1* | 7/2008 | Sah et al. | 475/117 |

* cited by examiner

*Primary Examiner*—Dirk Wright

(57) ABSTRACT

A method and an apparatus for controlling an electro-mechanical transmission selectively operative in a plurality of fixed gear modes and continuously variable modes is provided. The exemplary transmission comprises first and second electrical machines and a hydraulic circuit comprising a plurality of pressure control devices and flow management valves. The method comprises monitoring an operating temperature of the electrical machines. A cooling flow rate in the hydraulic circuit effective to reduce the operating temperature of the electrical machines is determined. Availability of active cooling for each of the electrical machines is determined. Hydraulic flow in the hydraulic circuit is selectively controlled.

14 Claims, 4 Drawing Sheets

METHOD AND APPARATUS TO CONTROL OPERATION OF A HYDRAULIC CONTROL CIRCUIT FOR AN ELECTRO-MECHANICAL TRANSMISSION

TECHNICAL FIELD

This invention pertains generally to control systems for electro-mechanical transmissions, and more specifically to control of a hydraulic circuit.

BACKGROUND OF THE INVENTION

Fuel/electric hybrid powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from an internal combustion engine, and an output member for delivering motive torque from the transmission to the vehicle driveline. Exemplary electro-mechanical transmissions are selectively operative in fixed gear modes and continuously variable modes through actuation of torque-transfer clutches. A fixed gear mode occurs when rotational speed of the transmission output member is a fixed ratio of rotational speed of the input member from the engine, typically due to actuation of one or more torque-transfer clutches. A continuously variable mode occurs when rotational speed of the transmission output member is variable based upon operating speeds of one or more electrical machines. The electrical machines can be connected to the output shaft via actuation of a clutch, or by direct connection. Clutch actuation and deactivation is typically effected through a hydraulic circuit, including electrically-actuated hydraulic flow management valves, pressure control solenoids, and pressure monitoring devices controlled by a control module.

Engineers implementing powertrain systems having electro-mechanical transmissions with hydraulically-actuated clutches are tasked with implementing transmission control schemes to manage operating temperatures of the electrical machines. Such a system is described hereinafter.

SUMMARY OF THE INVENTION

In order to address the concerns raised hereinabove and in accordance with an embodiment of the invention, a method and an apparatus comprising a control system for an electro-mechanical transmission selectively operative in a plurality of fixed gear modes and continuously variable modes is provided. The exemplary electro-mechanical transmission comprises first and second electrical machines and a hydraulic circuit comprising a plurality of pressure control devices and flow management valves. The method comprises monitoring an operating temperature of the electrical machines. A cooling flow rate in the hydraulic circuit effective to reduce the operating temperature of the electrical machines is determined. Availability of active cooling for each of the electrical machines is determined. Hydraulic flow in the hydraulic circuit is selectively controlled.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
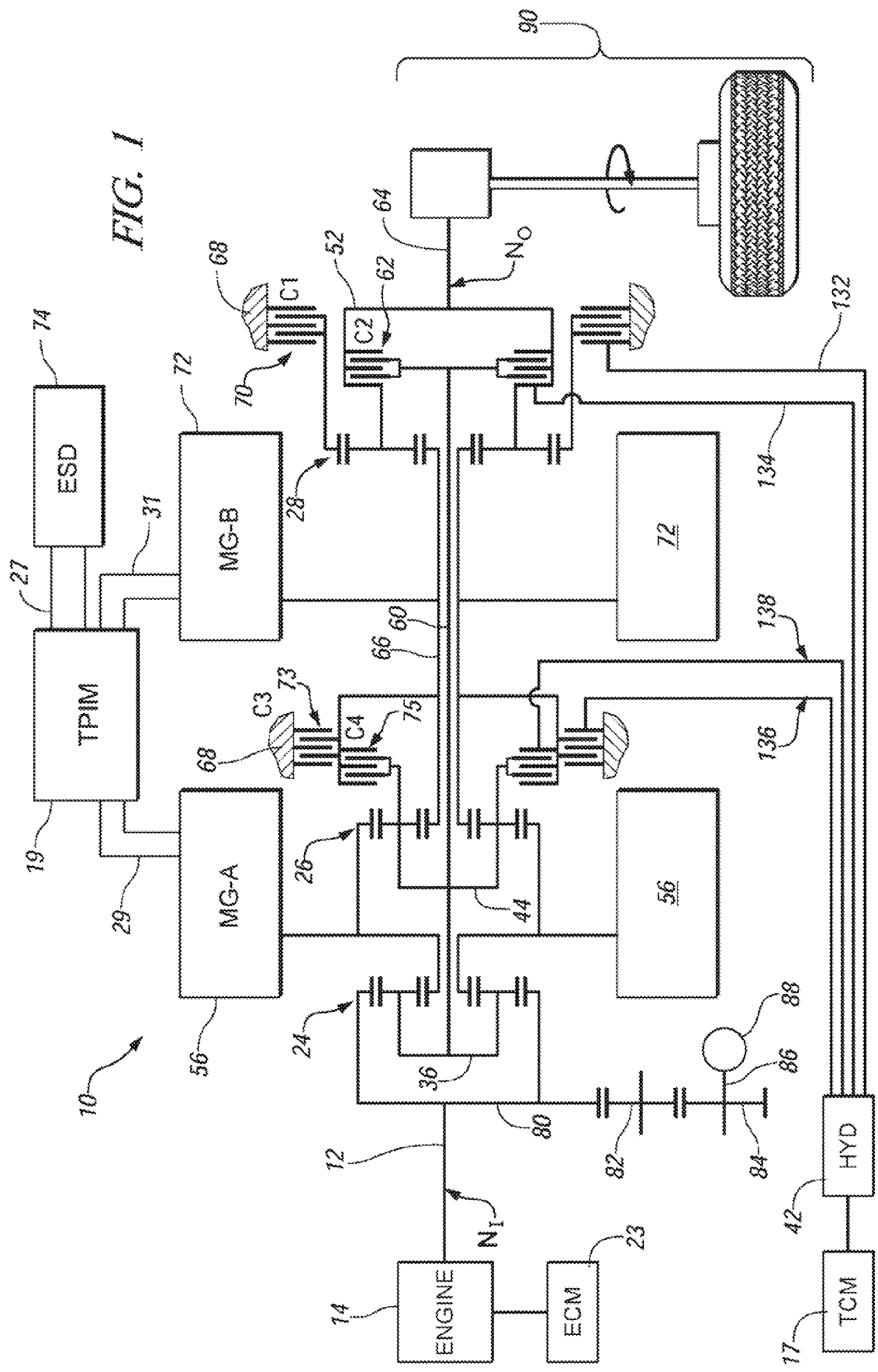
FIG. 1 is a schematic diagram of an exemplary powertrain, in accordance with the present invention.
Figure 2:
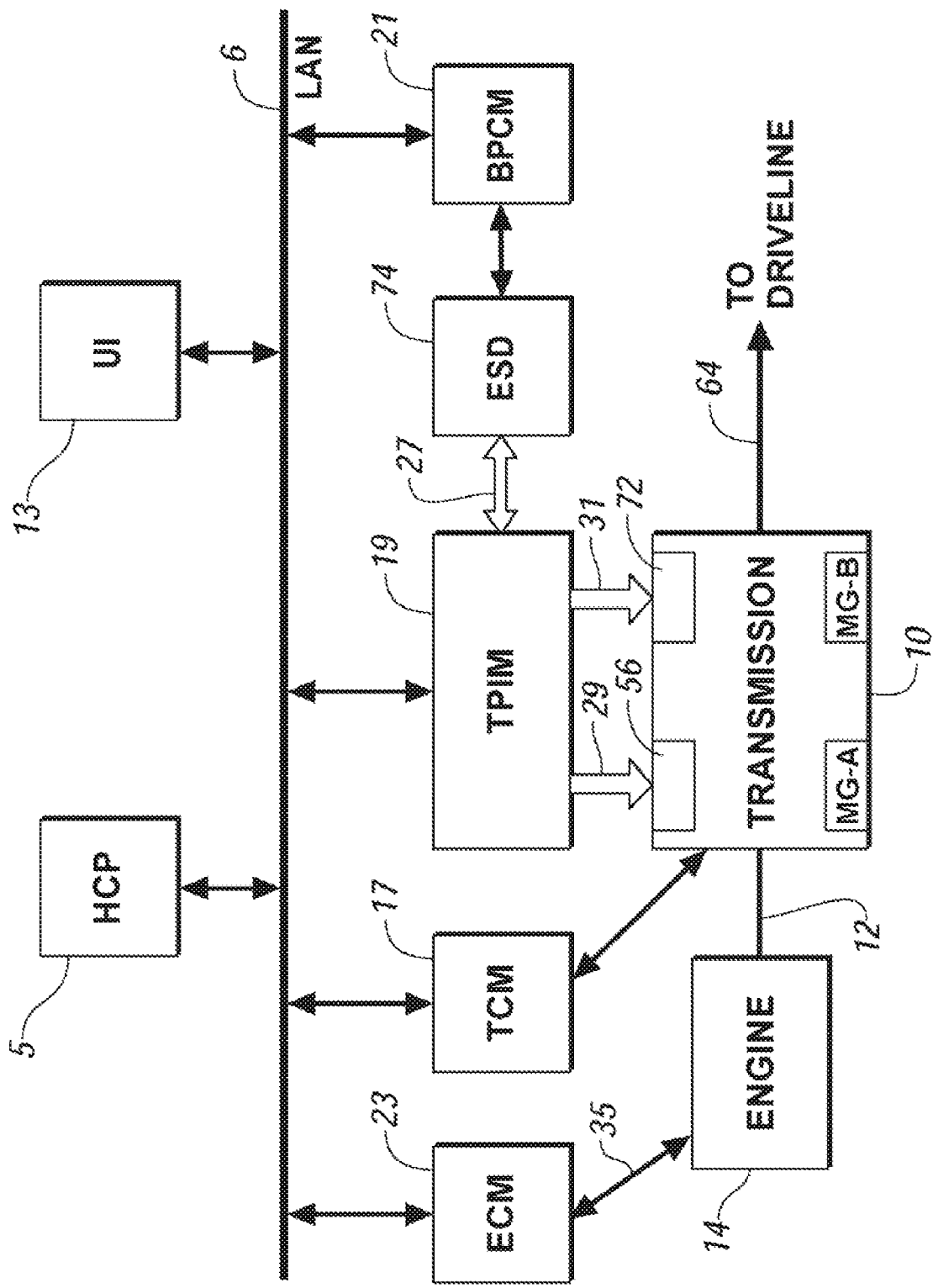
FIG. 2 is a schematic diagram of an exemplary architecture for a control system and powertrain, in accordance with the present invention.
Figure 3:
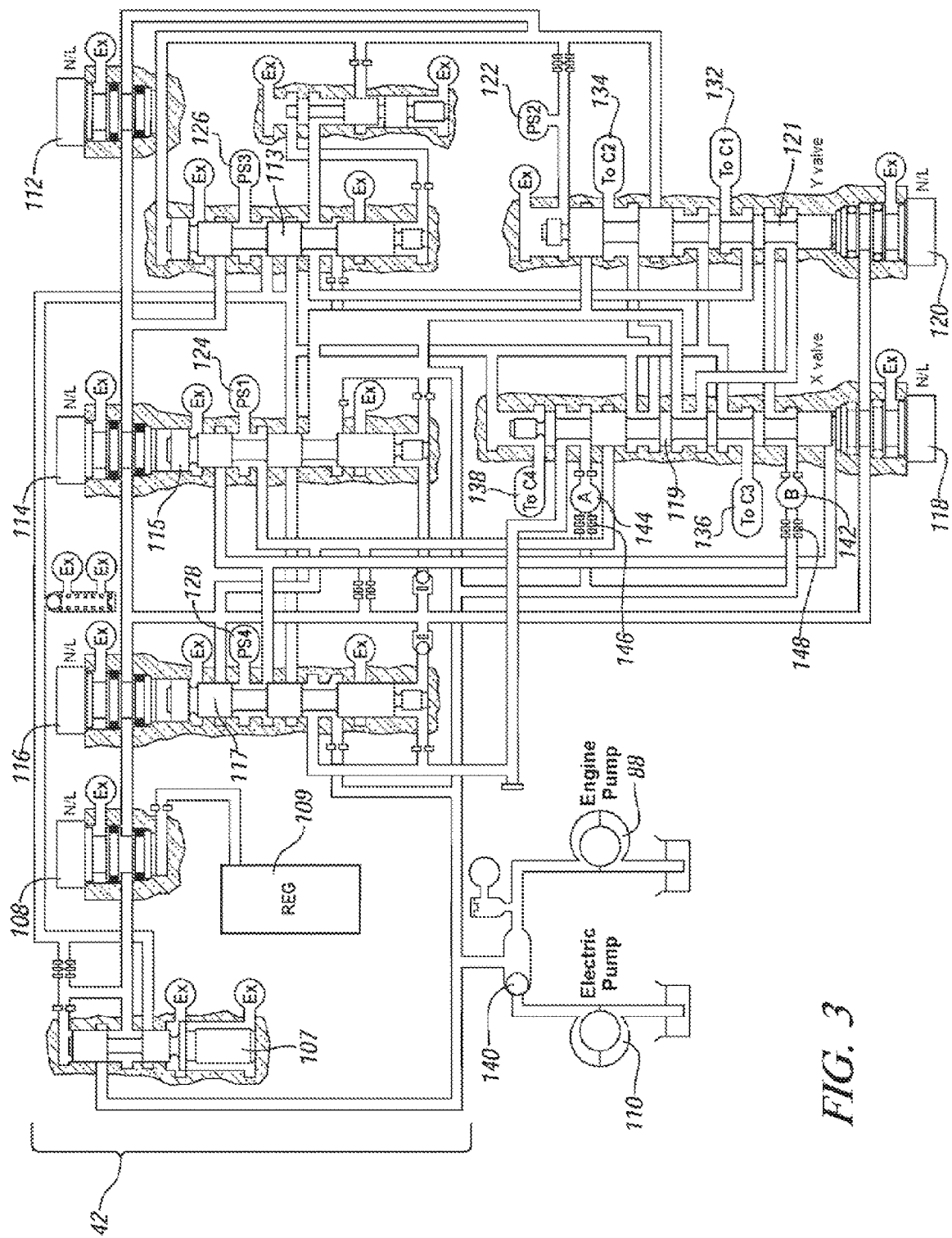
FIG. 3 is a schematic diagram of a hydraulic circuit, in accordance with the present invention.

Referring now to the drawings, wherein the depictions are for the purpose of illustrating the invention only and not for the purpose of limiting the same, FIGS. 1, 2, and 3 depict a system comprising an engine 14, transmission 10, control system, and hydraulic control circuit 42 which has been constructed in accordance with an embodiment of the present invention.

Mechanical aspects of exemplary transmission 10 are disclosed in detail in commonly assigned U.S. Pat. No. 6,953, 409, entitled "Two-Mode, Compound-Split, Hybrid Electro-Mechanical Transmission having Four Fixed Ratios", which is incorporated herein by reference. The exemplary two-mode, compound-split, electro-mechanical hybrid transmission embodying the concepts of the present invention is depicted in FIG. 1, and is designated generally by the numeral 10. The transmission 10 has an input shaft 12 that is preferably directly driven by an internal combustion engine 14. The transmission 10 utilizes three planetary-gear sets 24, 26 and 28, and four torque-transmitting devices, i.e. clutches C1 70, C2 62, C3 73, and C4 75. The electro-hydraulic control system 42, preferably controlled by transmission control module 17, is operative to control actuation and deactivation of the clutches via hydraulic fluid lines 132, 134, 136, and 138. Clutches C2 and C4 preferably comprise hydraulically-actuated rotating friction clutches. Clutches C1 and C3 preferably comprise comprising hydraulically-actuated stationary devices grounded to the transmission case 68.

The three planetary gear sets 24, 26 and 28 each comprise simple planetary gear sets. Furthermore, the first and second planetary gear sets 24 and 26 are compounded in that the inner gear member of the first planetary gear set 24 is conjoined to an outer gear member of the second planetary gear set 26, and connected to a first electrical machine comprising a motor/generator 56, also referred to as "MG-A".

The planetary gear sets 24 and 26 are further compounded in that carrier 36 of the first planetary gear set 24 is conjoined through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through clutch C2 62. The carrier 52 of the third planetary gear set 28 is connected directly to the transmission output member 64. An inner gear member of the second planetary gear set 26 is connected to an inner gear member of the third planetary gear set 28 through a sleeve shaft 66 that circumscribes shaft 60, and is connected to a second electrical machine comprising a motor/generator 72, referred to as MG-B.

All the planetary gear sets 24, 26 and 28 as well as MG-A and MG-B 56 and 72 are coaxially oriented, as about the axially disposed shaft 60. MG-A and MG-B 56 and 72 are both of an annular configuration which permits them to circumscribe the three planetary gear sets 24, 26 and 28 such that the planetary gear sets 24, 26 and 28 are disposed radially inwardly of the MG-A and MG-B 56 and 72. Transmission output member 64 is operably connected to a vehicle driveline 90 to provide motive torque. Each clutch is preferably hydraulically actuated, receiving pressurized hydraulic fluid from a pump, described below, via an electro-hydraulic control circuit 42 described hereinbelow with reference to FIG. 3.

The transmission 10 receives input motive torque from the torque-generative devices, including the engine 14 and the MG-A 56 and MG-B 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module (TPIM) 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged TPIM 19 includes the pair of power inverters and respective motor control modules configured to receive motor control commands and control inverter states therefrom for providing motor drive or regeneration functionality.

In motoring control, the respective inverter receives current from the DC transmission lines and provides AC current to the respective electrical machine, i.e. MG-A and MG-B, over transfer conductors 29 and 31. In regeneration control, the respective inverter receives AC current from the electrical machine over transfer conductors 29 and 31 and transmits current to the DC lines 27. The net DC current provided to or from the inverters determines the charge or discharge operating mode of the electrical energy storage device 74. The inverters comprise known complementary three-phase power electronics devices. Preferably, MG-A 56 and MG-B 72 are three-phase AC machines each having a rotor operable to rotate within a stator that is mounted on a case of the transmission. Each machine stator includes a temperature sensor (not depicted) signally connected to the TPIM, and operative to monitor stator temperature.

Referring now to FIG. 2, a schematic block diagram of the control system, comprising distributed control module architecture, is depicted. The elements described hereinafter comprise a subset of overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and TPIM 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through an operator torque request. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: the operator torque request, an engine torque command, clutch torque commands for the various clutches C1, C2, C3, C4 of the transmission 10; and motor torque commands for MG-A and MG-B. The TCM is operatively connected to the electro-hydraulic control circuit 42 detailed in FIG. 3, including monitoring various pressure sensing devices (not depicted) and generating and executing control signals for various pressure control solenoids and control valves contained therein.

The ECM 23 is operably connected to the engine 14, and functions to acquire data from a variety of sensors and control a variety of actuators, respectively, of the engine 14 over a plurality of discrete lines collectively depicted as aggregate line 35. The ECM 23 receives the engine torque command from the HCP 5, and generates a desired axle torque, and an indication of actual engine torque input to the transmission, which is communicated to the HCP 5. For simplicity, ECM 23 is depicted generally having bi-directional interface with engine 14 via aggregate line 35. Various other parameters that may be sensed by ECM 23 include engine coolant temperature, engine input speed, $N_I$, to shaft 12 leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques for each of the clutches C1, C2, C3, and, C4 and rotational speed, $N_O$, of the output shaft 64. Other actuators and sensors may be used to provide additional information from the TCM to the HCP for control purposes. The TCM 17 monitors inputs from pressure switches and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, battery voltage and available battery power.

The TPIM 19 includes previously referenced power inverters and motor control modules configured to receive motor control commands and control inverter states therefrom to provide motor drive or regeneration functionality. The TPIM 19 is operable to generate torque commands for MG-A 56 and MG-B 72, based upon input from the HCP 5, which is driven by operator input through UI 13 and system operating parameters. The motor torque commands for MG-A and MG-B are implemented by the control system, including the TPIM 19, to control MG-A and MG-B. Individual motor speed signals for MG-A and MG-B are derived by the TPIM 19 from the motor phase information or conventional rotation sensors. The TPIM 19 determines and communicates motor speeds to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged. The TPIM is operative to monitor signal inputs from the temperature sensors operative to monitor each of the stators of the electrical machine.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In response to an operator's action, as captured by the UI 13, the supervisory HCP control module 5 and one or more of the other control modules determine the operator torque request at shaft 64. Selectively operated components of the transmission 10 are appropriately controlled and manipulated to respond to the operator demand. For example, in the exemplary embodiment depicted in FIGS. 1 and 2, when the operator has selected a forward drive range and manipulates either the accelerator pedal or the brake pedal, the HCP 5 determines an output torque which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to achieve the operator torque request. Under the direction of the HCP 5, the transmission 10 operates over a range of output speeds from slow to fast in order to meet the operator demand.

The exemplary two-mode, compound-split, electro-mechanical transmission operates in several fixed gear operating modes and continuously variable operating modes, described with reference to FIG. 1, and Table 1, below.

TABLE 1

| Transmission Operating Mode | Actuated Clutches | |
| --- | --- | --- |
| Mode I | C1 70 | |
| Fixed Ratio (GR1) | C1 70 | C4 75 |
| Fixed Ratio (GR2) | C1 70 | C2 62 |
| Mode II | C2 62 | |
| Fixed Ratio (GR3) | C2 62 | C4 75 |
| Fixed Ratio (GR4) | C2 62 | C3 73 |

The various transmission operating modes described in the table indicate which of the specific clutches C1, C2, C3, and C4 are engaged or actuated for each operating mode. Additionally, in various transmission operating modes, MG-A and MG-B may each operate as electrical motors to generate motive torque, or as a generator to generate electrical energy. A first mode, or gear train, is selected when clutch C1 70 is actuated in order to "ground" the outer gear member of the third planetary gear set 28. A second mode, or gear train, is selected when clutch C1 70 is released and clutch C2 62 is simultaneously actuated to connect the shaft 60 to the carrier of the third planetary gear set 28. Other factors outside the scope of the invention affect when the electrical machines 56, 72 operate as motors and generators, and are not discussed herein.

The control system, depicted primarily in FIG. 2, is operable to provide a range of transmission output speeds at shaft 64 from relatively slow to relatively fast within each mode of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second continuously variable modes of operation refer to circumstances in which the transmission functions are controlled by one clutch, i.e. either clutch C1 62 or C2 70, and by the controlled speed and torque of the electrical machines 56 and 72, which can be referred to as a continuously variable transmission mode. Certain ranges of operation are described below in which fixed ratios are achieved by applying an additional clutch. This additional clutch may be clutch C3 73 or C4 75, as depicted in the table, above.

When the additional clutch is applied, fixed ratio operation of input-to-output speed of the transmission, i.e. $N_I/N_O$, is achieved. The rotations of machines MG-A and MG-B 56, 72 are dependent on internal rotation of the mechanism as defined by the clutching and proportional to the input speed measured at shaft 12. The machines MG-A and MG-B function as motors or generators. They are completely independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from MG-A and MG-B, through planetary gear set 28 by accepting power from ESD 74.

Referring to FIG. 3, a schematic diagram is depicted which provides a more detailed description of the exemplary electro-hydraulic system for controlling flow of hydraulic fluid in the exemplary transmission. The main hydraulic pump 88, driven off the input shaft from the engine 10, and auxiliary pump 110, operatively electrically controlled by the TPIM 19, provide pressurized fluid to the hydraulic circuit 42 through valve 140. The auxiliary pump 110 preferably comprises an electrically-powered pump of an appropriate size and capacity to provide sufficient flow of pressurized hydraulic fluid into the hydraulic system when operational. Pressurized hydraulic fluid flows into electro-hydraulic control circuit 42, which is operable to selectively distribute hydraulic pressure to a series of devices, including the torque-transfer clutches C1 70, C2 62, C3 73, and C4 75, active cooling circuits for machines A and B, and a base cooling circuit for cooling and lubricating the transmission 10 via passages 142, 144 (not depicted in detail). As previously stated, the TCM 17 is preferably operable to actuate the various clutches to achieve various transmission operating modes through selective actuation of hydraulic circuit flow control devices comprising variable pressure control solenoids ('PCS') PCS1 108, PCS2 112, PCS3 114, PCS4 116 and solenoid-controlled flow management valves X-valve 118 and Y-valve 120. The circuit is fluidly connected to pressure switches PS1, PS2, PS3, and PS4 via passages 124, 122, 126, and 128, respectively. The pressure control solenoid PCS1 108 has a control position of normally high and is operative to modulate magnitude of fluidic pressure in the hydraulic circuit through fluidic interaction with controllable pressure regulator 109. Controllable pressure regulator 109, not shown in detail, interacts with PCS1 108 to control hydraulic pressure in the hydraulic circuit 42 over a range of pressure, depending upon operating conditions as described hereinafter. Pressure control solenoid PCS2 112 has a control position of normally low, and is fluidly connected to spool valve 113 and operative to effect flow therethrough when actuated. Spool valve 113 is fluidly connected to pressure switch PS3 via passage 126. Pressure control solenoid PCS3 114 has a control position of normally low, and is fluidly connected to spool valve 115 and operative to effect flow therethrough when actuated. Spool valve 115 is fluidly connected to pressure switch PS1 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states refer to positions of each valve to which control flow to different devices in the hydraulic circuit 42 and the transmission 10. The X-valve 119 is operative to direct pressurized fluid to clutches C3 and C4 and cooling systems for stators of MG-A and MG-B via fluidic passages 136, 138, 144, 142 respectively, depending upon the source of the fluidic input, as is described hereinafter. The Y-valve 121 is operative to direct pressurized fluid to clutches C1 and C2 via fluidic passages 132 and 134 respectively, depending upon the source of the fluidic input, as is described hereinafter. The Y-valve 121 is fluidly connected to pressure switch PS2 via passage 122. A more detailed description of the exemplary electro-hydraulic control circuit 42 is provided in commonly assigned U.S. patent application Ser. No. 11/263,216, entitled "A Multiplexed Pressure Switch System for an Electrically Variable Hybrid Transmission", which is incorporated herein by reference.

The hydraulic circuit includes a base cooling circuit for providing hydraulic fluid to cool the stators for MG-A 56 and MG-B 72. The base cooling circuit includes fluid conduits from the valve 140 flowing directly to a flow restrictor 146 which leads to fluidic passage 144 leading to the base cooling circuit for the stator of MG-A 56, and to flow restrictor 148 which leads to fluidic passage 142 leading to the base cooling circuit for the stator of MG-B 72. Active cooling of stators for MG-A 56 and MG-B 72 is effected by selective actuation of pressure control solenoids PCS2 112 PCS3 114 and PCS4 116 and solenoid-controlled flow management valves X-valve 118 and Y-valve 120, which leads to flow of hydraulic fluid around the selected stator and permits heat to be transferred therebetween, primarily through conduction.

An exemplary logic table to accomplish control of the exemplary electro-hydraulic control circuit 42 is provided with reference to Table 2, below.

TABLE 2

| Operating State | X-Valve Logic No Latch | Y-Valve Logic C2 Latch | PCS1 Normal High | PCS2 Normal High | PCS3 Normal High | PCS4 Normal Low |
|---|---|---|---|---|---|---|
| EVT Mode I | 0 | 0 | Line Modulation | MG-B Stator Cool | C1 | MG-A Stator Cool |
| EVT Mode II | 0 | 1 | Line Modulation | C2 | MG-B Stator Cool | MG-A Stator Cool |
| Low Range | 1 | 0 | Line Modulation | C2 | C1 | C4 |
| High Range | 1 | 1 | Line Modulation | C2 | C3 | C4 |

Selective control of the X and Y valves and actuation of the solenoids PCS2, PCS3, and PCS4 facilitate flow of hydraulic fluid to actuate clutches C1, C2, C3, and C4, and provide cooling for the stators of MG-A and MG-B.

In operation, an operating mode, i.e. one of the fixed gear and continuously variable mode operations, is determined for the exemplary transmission based upon a variety of operating characteristics of the powertrain. This includes demand for an operator demand for torque, typically communicated through inputs to the UI 13 as previously described. Additionally, a demand for output torque is predicated on external conditions, including, e.g., road grade, road surface conditions, or wind load. The operating mode may be predicated on a powertrain torque demand caused by a control module command to operate of the electrical machines in an electrical energy generating mode or in a torque generating mode. The operating mode can be determined by an optimization algorithm or routine operable to determine optimum system efficiency based upon operator demand for power, battery state of charge, and energy efficiencies of the engine 14 and MG-A and MG-B 56, 72. The control system manages torque inputs from the engine 14 and MG-A and MG-B 56, 72 based upon an outcome of the executed optimization routine, and system optimization occurs to optimize system efficiencies to improve fuel economy and manage battery charging. Furthermore, operation can be determined based upon a fault in a component or system.

Referring now to the transmission described with reference to FIGS. 1, 2, and 3, and Tables 1 and 2, specific aspects of the transmission and control system are described herein. The control system is operative to selectively actuate the pressure control devices and the flow management valves based upon a demand for torque, presence of a fault, and temperatures of the electric motors. The control system selectively commands one of the low-range continuously variable operation, the high-range continuously variable operation, the low range state, and the high range state based upon selective actuation of the X-valve 118 and Y-valve 120 flow management valves. The control system effects actuation of the stator cooling system the first electrical machine (MG-A Stator Cool), the stator cooling system for the second electrical machine (MG-B Stator Cool), and the first hydraulically-actuated clutch (C1) based upon selective actuation of the pressure control device PCS2, PCS3, and PCS4 when the low-range continuously variable operation has been commanded. Furthermore, the control system is operative to effect actuation of the stator cooling system for MG-A, stator cooling system for MG-B, and the second hydraulically-actuated clutch C2 based upon selective actuation of the pressure control devices when the high-range continuously variable operation has been commanded. The control system is operative to effect actuation of the first, second, and fourth hydraulically-actuated clutches (i.e., C1, C2, C4) based upon selective actuation of the pressure control devices when the low-range state has been commanded, comprising operation in one of the first, second, and third fixed gear ratios via selective actuation of the clutches. The control system is operative to effect actuation of the second, third, and fourth hydraulically-actuated clutches (i.e., C2, C3, C4) based upon selective actuation of the pressure control devices when the high-range state has been commanded, comprising operation in one of the third and fourth fixed gear ratios via selective actuation of the clutches.

As previously stated, fluid output from each of the second, third and fourth pressure control devices (i.e., PCS2, PCS3, and PCS4) is selectively mapped to one of the four hydraulically-actuated clutches and stator cooling systems for MG-A and MG-B based upon commanded positions of the first and second flow management valves. Therefore, selective actuation of PCS2 effects flow of hydraulic fluid to provide cooling to the stator of MG-B, when both the X-valve and the Y-valve are commanded to Low. Selective actuation of PCS2 effects flow of hydraulic fluid to actuate clutch C2 when either of the X-valve and the Y-valve are commanded to High. Selective actuation of PCS3 effects flow of hydraulic fluid to actuate clutch C1 when both the X-valve and the Y-valve are commanded to Low. Selective actuation of PCS3 effects flow of hydraulic fluid to provide cooling to the stator of MG-B when the X-valve is commanded to Low and the Y-valve is commanded to High. Selective actuation of PCS3 effects flow of hydraulic fluid to actuate clutch C1 when the X-valve is commanded to High and the Y-valve is commanded to Low. Selective actuation of PCS3 effects flow of hydraulic fluid to actuate clutch C3 when both the X-valve and the Y-valve are commanded to High. Selective actuation of PCS4 effects flow of hydraulic fluid to provide cooling to the stator of MG-A when the X-valve is commanded to Low, regardless of the position to which the Y-valve is commanded. Selective actuation of PCS4 effects flow of hydraulic fluid to actuate clutch C4 when the X-valve is commanded to High, regardless of the position to which the Y-valve is commanded.

Figure 4:
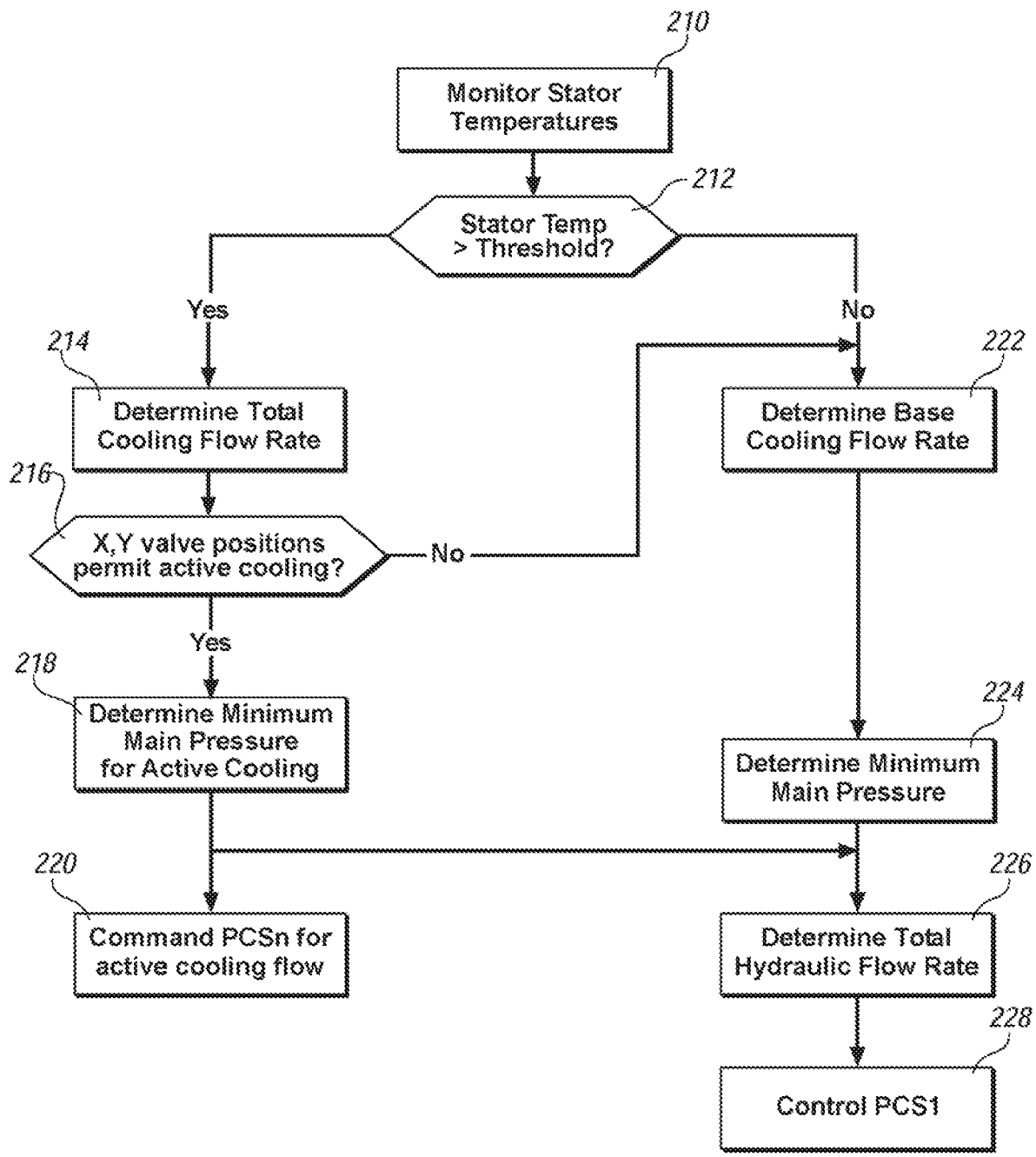
FIG. 4 is an algorithmic flowchart, in accordance with the present invention.

Referring now to the flowchart depicted in FIG. 4, with reference to the exemplary transmission described with reference to FIGS. 1, 2, and 3, and Tables 1 and 2, specific aspects of controlling operation of the exemplary transmission and control system are described, comprising a control scheme for selectively controlling the pressure control devices, i.e., PCS2, PCS3, and PCS4, and flow management valves X-valve 118 and Y-valve 120 to provide flow of hydraulic fluid to effect cooling of the stators of MG-A and MG-B.

Operating temperatures of the stators are ongoingly monitored by the control system using signal inputs from the stator temperature sensors (Block 210). When temperature measured by the sensors at either of the stators of MG-A or MG-B exceeds a predetermined threshold, the control system seeks to increase motor cooling by increasing flow of hydraulic fluid to and over the stator (Block 212). The predetermined threshold temperature is calibrated in the range of 200 C. for this embodiment, and preferably comprises a temperature which is determined based upon material properties of components of the stator and rotor and other surrounding components to prevent creation of component faults.

To increase motor cooling by increasing flow of hydraulic fluid to the stator (Block 212), a total hydraulic fluid flow rate required for effectively cooling the stator is determined (Block 214). Increasing flow of hydraulic fluid comprises increasing flow through one of the base cooling circuits, and causing flow through one of the active cooling circuits when conditions so permit.

The total hydraulic flow rate required includes sufficient flow to achieve the required clutch capacity to transmit motive torque through the transmission, and stator cooling flow. Stator cooling flow includes flow through the base cooling circuit, and when enabled, flow through the active cooling circuit. The intent is to provide a hydraulic flow rate sufficient to effectively reduce the stator temperature below the threshold temperature through heat transfer from the stator to the hydraulic fluid, which can be subsequently cooled through known hydraulic transmission fluid cooling devices.

It is next determined whether the flow management valves 118, 120 are in positions which permit active motor cooling through the active cooling circuits (Block 216). Flow management valve positions which permit active motor cooling include any one of Mode I, Mode II, and Neutral, as depicted with reference to Table 2. When active motor cooling is permitted, a minimum value for main pressure is determined to achieve total required flow with active cooling initiated, including maintaining pressure for clutch actuation (Block 218). Active cooling preferably includes operating the selected pressure control solenoid, 'PCSn', i.e. PCS2, PCS3, and PCS4, to a full-on position to effect maximized flow of hydraulic fluid to the stator for cooling (Block 220). Active cooling further includes determining total hydraulic flow needs of the hydraulic system, taking into account hydraulic flow through the actuated pressure control solenoid that is fully open, hydraulic flow necessary to achieve pressure for the required clutch torque capacity to transmit motive torque, and any other flow needs typically necessary for operation of the transmission (Block 226). The control system modulates flow through valve 107 using PCS1 108 to achieve sufficient flow of hydraulic fluid into the hydraulic circuit at the required pressure, which is controlled using regulator 109 (Block 228).

When active motor cooling is not permitted and the stator temperature has exceeded the threshold, there remains a need to cool the stator, using flow through the base cooling circuit. A base cooling flow rate is determined (Block 222). A minimum value for main pressure is determined to achieve total required flow through the base cooling circuit to the stator for effective cooling (Block 224). A total hydraulic flow rate necessary to achieve base cooling, to achieve pressure for the required clutch torque capacity to transmit motive torque, and any other flow needs typically necessary for operation of the transmission is determined (again, Block 226). The control system modulates flow through valve 107 using PCS1 108 to achieve sufficient flow of hydraulic fluid into the hydraulic circuit at the required pressure (again, Block 228).

When temperatures at the stators do not exceed the predetermined threshold, the stators are cooled using the base cooling circuit (Block 212). A base cooling flow rate is determined, based upon the stator temperature (Block 222), and a minimum main pressure is determined to achieve the base cooling flow (Block 224). Total flow needs of the hydraulic system are determined, taking into account the hydraulic flow necessary to achieve pressure for the required clutch capacity to transmit motive torque and any other flow needs typically necessary for operation of the transmission (Block 226). The control modulates flow through valve 107 using PCS1 108 and the regulator 109 to achieve necessary flow of hydraulic fluid into the hydraulic circuit and achieve the required pressure (Block 228).

It is understood that modifications are allowable within the scope of the invention. The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to control an electro-mechanical transmission comprising first and second electrical machines and a hydraulic circuit comprising a plurality of pressure control devices and flow management valves, the method comprising:
   monitoring an operating temperature of the electrical machines;
   determining a cooling flow rate in the hydraulic circuit effective to reduce the operating temperature of the electrical machines;
   determining availability of active cooling for each of the electrical machines; and,
   selectively controlling hydraulic flow in the hydraulic circuit.

2. The method of claim 1, wherein selectively controlling hydraulic flow in the hydraulic circuit comprises:
   determining a base cooling flow rate effective to cool the electrical machines; and,
   controlling hydraulic flow to achieve the base cooling flow rate.

3. The method of claim 2, further comprising determining a minimum main pressure to achieve the base cooling flow rate.

4. The method of claim 3, further comprising determining a total flow rate to the hydraulic circuit, and, selectively actuating one of the pressure control devices to effect the total flow rate at the minimum main pressure.

5. The method of claim 1, further comprising:
   determining a minimum main pressure when active cooling for one of the electrical machines is available;
   selectively actuating one of the pressure control devices to effect active cooling;
   determining a total flow rate to the hydraulic circuit; and,
   selectively actuating one of the pressure control devices to effect the total flow rate at the minimum main pressure.

6. The method of claim 1, wherein determining the cooling flow rate in the hydraulic circuit effective to reduce the operating temperature of the electrical machines comprises determining a required cooling flow rate when the operating temperature of the electrical machines is greater than a threshold temperature.

7. The method of claim 6, wherein determining the required cooling flow rate effective to reduce the operating temperature of the electrical machines further comprises determining a flow rate to a stator of one of the electrical machines effective to reduce the stator temperature.

8. The method of claim 1, wherein determining availability of active cooling for each of the electrical machines comprises determining the flow management valves are positioned to effect operation of the electro-mechanical transmission in one of a first continuously variable operating mode and a second continuously variable operating mode.

9. Article of manufacture, comprising a storage medium having a computer program encoded therein for effecting a method to control an electro-mechanical transmission comprising first and second electrical machines and a hydraulic circuit comprising a plurality of pressure control devices and flow management valves, the computer program comprising:
   code to monitor an operating temperature of the electrical machines;
   code to determine a cooling flow rate in the hydraulic circuit effective to reduce the operating temperature of the electrical machines;
   code to determine availability of active cooling for each of the electrical machines; and,
   code to selectively control hydraulic flow in the hydraulic circuit.

10. The article of manufacture of claim 9, wherein the code to selectively control hydraulic flow in the hydraulic circuit comprises:
    code to determine a base cooling flow rate effective to cool the electrical machines; and,
    code to control hydraulic flow to achieve the base cooling flow rate.

11. The article of manufacture of claim 9, wherein the code to selectively control hydraulic flow in the hydraulic circuit comprises:
    code to determine a minimum main pressure when active cooling for one of the electrical machines is available;
    code to selectively actuate one of the pressure control devices to effect active cooling;
    code to determine a total flow rate to the hydraulic circuit; and,
    code to selectively actuate one of the pressure control devices to effect the total flow rate at the minimum main pressure.

12. Device to transmit torque to a driveline, comprising:
    first and second electrical machines and a plurality of planetary gear sets coaxially oriented about a shaft;
    a plurality of torque-transfer devices selectively actuatable by a hydraulic circuit, the hydraulic circuit comprising a plurality of pressure control devices and first and second flow management valves and a plurality of pressure monitoring devices; and,
    a control system, adapted to:
    i) monitor an operating temperature of the electrical machines;
    ii) determine a cooling flow rate in the hydraulic circuit effective to reduce the operating temperature of the electrical machines;
    iii) determine availability of active cooling for each of the electrical machines; and,
    iv) selectively control hydraulic flow in the hydraulic circuit.

13. The device of claim 12, wherein the control system adapted to selectively control hydraulic flow in the hydraulic circuit comprises the control system adapted to:

determine a base cooling flow rate effective to cool the electrical machines; and, control hydraulic flow to achieve the base cooling flow rate.

14. The device of claim 12, wherein the control system adapted to selectively control hydraulic flow in the hydraulic circuit comprises the control system adapted to:

determine a minimum main pressure when active cooling for one of the electrical machines is available;

selectively actuate one of the pressure control devices to effect active cooling;

determine a total flow rate to the hydraulic circuit; and, selectively actuate one of the pressure control devices to effect the total flow rate at the minimum main pressure.

* * * * *